United States Patent [19]
Kira et al.

[11] Patent Number: 5,225,951
[45] Date of Patent: Jul. 6, 1993

[54] THIN FILM MAGNETIC HEAD WITH REDUCED INTERNAL STRESSES

[75] Inventors: Tohru Kira, Tenri; Kozi Otsuka, Yamatokoriyama; Kazuyoshi Imae, Higashiosaka; Mitsuhiko Yoshikawa, Ikoma; Kengo Shiiba, Nara, all of Japan

[73] Assignee: Sharp Kabushiki Kaisha, Osaka, Japan

[21] Appl. No.: 869,056

[22] Filed: Apr. 16, 1992

Related U.S. Application Data

[60] Continuation of Ser. No. 688,248, Apr. 22, 1991, abandoned, which is a division of Ser. No. 497,723, Mar. 15, 1990, abandoned, which is a continuation of Ser. No. 310,504, Feb. 14, 1989, abandoned, which is a continuation of Ser. No. 946,198, Dec. 24, 1986, abandoned.

[30] Foreign Application Priority Data

Dec. 27, 1985 [JP] Japan .................. 60-298050
Oct. 2, 1986 [JP] Japan .................. 61-235057
Oct. 9, 1986 [JP] Japan .................. 61-241818
Oct. 24, 1986 [JP] Japan .................. 61-253956

[51] Int. Cl.$^5$ ............................................. G11B 5/127
[52] U.S. Cl. ......................................................... 360/113
[58] Field of Search ............. 360/113, 125; 338/32 R; 324/252

[56] References Cited

U.S. PATENT DOCUMENTS

| | | | |
|---|---|---|---|
| 4,394,699 | 7/1983 | Kaminaka et al. | 360/113 |
| 4,617,600 | 10/1986 | Somers | 360/113 |
| 4,663,607 | 5/1987 | Kitada et al. | 360/113 |
| 4,914,538 | 4/1990 | Howard et al. | 360/113 |
| 5,005,096 | 4/1991 | Krounbi et al. | 360/113 |

FOREIGN PATENT DOCUMENTS

| | | | |
|---|---|---|---|
| 0050612 | 3/1985 | Japan | 360/113 |
| 0105717 | 5/1986 | Japan | 360/113 |

Primary Examiner—Andrew L. Sniezek

[57] ABSTRACT

A thin film magnetic head includes yokes for leading magnetic flux of signals generated from a magnetic recording medium up to a magnetic resistance effect element. The yokes are made of sputtered films having internal compressive stress therein. The internal stress in the yokes which are deleterious to the magnetic properties of the magnetic resistance effect element can be negated or reduced by including a film of material on the yokes for compensating for the internal stresses.

6 Claims, 10 Drawing Sheets

θ=25°

θ=20°

THIN FILM MAGNETIC HEAD WITH REDUCED INTERNAL STRESSES

This application is a continuation of application Ser. No. 07/688,248 filed on Apr. 22, 1991, which is a Rule 60 Divisional of Ser. NO. 07/497,723 filed on Mar. 15, 1990 which is a Rule 62 Continuation of Ser. No. 07/310,504 filed on Feb. 14, 1989 which is a Rule 62 Cotinuation of Ser. No. 06/946,198 filed on Dec. 24, 1986 all of which are now abandoned.

BACKGROUND OF THE INVENTION

The present invention relates to a thin-film yoke magnetoresistive head ('a yoke thin film magnetic head' is referred to as a YMR head hereinbelow) which is provided with a magnetoresistive element ('a magnetic resistance effect element' is referred to as an MR element hereinbelow) applying the magnetoresistive effect of a ferromagnetic thin film so as to detect the magnetic flux of signals recorded onto a magnetic recording medium.

As shown in FIG. 19, a known YMR head is comprised of a first insulation layer 52 formed on a substrate 51 having high permeability, a conductor 54 to apply bias magnetic field to an MR element formed on the first insulation layer 52, a second insulation layer 53 covering the conductor 54, an MR element 55 placed on the second insulation layer 53, a gap insulation layer 56 so formed as to cover all of the MR element 55, the second insulation layer 53 and the first insulation layer 52, a first yoke 57 and a second yoke 58. The YMR head is placed adjacent to a magnetic recording medium 59.

For the yokes 58 and 57 formed on the gap insulation layer 56, sputtered Ni-Fe films are employed because of their readiness for property control, their superior productivity and magnetic properties enjoyed in the case where a step difference is present in the substrate 51, etc.

In general, however, the sputtered Ni-Fe films referred to above cannot display satisfactory magnetic properties unless they are applied with high negative substrate bias when sputtered (with reference to I.E.E.E TRANSACTION ON MAGNETIC, VOL. MAG-15, NO. 6 (1979) P.1821 "Structure-sensitive Magnetic Properties of RF Sputtered Ni-Fe Films"). In other words, if the substrate biasing voltage is low, the direction of the easy axis of the sputtered films is vertical to the film surface. Moreover, in the case where no negative substrate bias is applied during sputtering, it is necessary that the target voltage should be high to increase the energy of particles incident on the substrate. Accordingly, a residual compressive stress in the sputtered Ni-Fe films increases due to the peening effect in any of the aforementioned manners. The residual stress in the magnetic thin film constituting the first and second yokes 57 and 58 remains even after the thin film is processed into the shape of a yoke. As a result of reaction to the residual internal stress in the yokes 57 and 58, it induces stress in the MR element 55. The induced stress in turn gives rise to a magnetic anisotropy within the MR element 55, which fact disturbs the magnetic anisotropy naturally induced to the MR element when the MR element 55 is evaporated. This anisotropy dispersion in the MR element 55 results in discontinuities of the magnetization curve inside the MR element 55, thereby giving rise to the generation of Barkhausen noises. Thus, as described above, the residual stress in the yokes has a bad influence on the characteristic of YMR head and therefore, it has been strongly desired to hold the internal stress to as small an amount as possible. However, since it is difficult to reduce the residual compressive stress of the sputtered film itself such as sputtered Ni-Fe film, it has been disadvantageous that Barkhausen noises are inevitably generated when the sputtered Ni-Fe film is used for the yoke material.

SUMMARY OF THE INVENTION

Accordingly, the present invention has been developed with a view to substantially eliminating the above-described disadvantage, and has for its essential object to provide a yoke thin film magnetic head, i.e., a YMR head which is arranged to cancel the residual compressive stress in the yokes indirectly to thoroughly restrict the generation of Barkhausen noises resulting from the internal compressive stress.

In accomplishing the above-described object, according to one preferred embodiment of the present invention, there is provided a yoke thin film magnetic head having yokes arranged in such a manner as to conduct the magnetic flux of signals generated from a magnetic recording medium to a magnetic resistance effect element, which yokes are made of sputtered films having the compressive stress therein. The yoke thin film magnetic head is further formed with an evaporated metal film having high melting points onto the yokes. Since the evaporated metal film of high melting points has internal tensile stress approximately equal to the internal compressive stress in the yokes, the thin film magnetic head of the present invention is effective to indirectly solve the bad influences occasioned by the internal compressive stress generated in the yokes upon a magnetic resistance effect element.

Furthermore, the yoke thin film magnetic head of the present invention includes the magnetic resistance effect element which detects the magnetic field of signals generated in the magnetic recording medium as the change in resistance, yokes for leading the magnetic flux from a head gap to the MR element, DC magnetic field application members for applying a desired weak magnetic field to the MR element in the longitudinal direction of the MR element and a conductor for applying a desired biasing magnetic field to the MR element in the stripe widthwise direction of the MR element. In the yoke thin film magnetic head, the easy magnetization axis of the MR element is inclined 5°-20° in the longitudinal direction of the MR element, such that the discontinuities are observed either at the positive side or at the negative side of the abscissa of $\Delta R/R$ curve, namely, the magnetic field Ha corresponding to the signal magnetic field. Moreover, the operating point of the MR element is moved to a point good at linearity, that is, to the side of the magnetic field Ha without the discontinuities observed. Accordingly, the magnetization switching takes place in the magnetic field area in the same direction as the biasing magnetic field can be avoided, and Barkhausen noises generated as a result of the magnetization switching can be prevented.

The thin film magnetic head is covered with a pattern of a yoke film for conducting the magnetic flux to the MR element. The pattern of a yoke film is coated with a stress cancel so as to cancel or reduce the stress generated inside the yoke film.

Another important object of the present invention is to provide a magnetic resistance effect thin film head.

The magnetic resistance effect thin film head has a first yoke, a magnetic resistance effect element (MR element) and a second yoke, each made of ferromagnetic thin film, magnetically united with each other sequentially in this order on a substrate. In the magnetic resistance effect thin film head, when the internal stress of the first and the second yokes is larger than zero, the magnetostriction constant of the MR element is set to be smaller than zero. On the other hand, when the internal stress of the first and the second yokes is smaller than zero, the magnetostriction constant of the MR element is determined to be larger than zero. Accordingly, because of this structure, although the magnetic anisotropy is caused in the MR element by the internal stress generated in the first and the second yokes, the direction of the magnetic anisotropy in the MR element is made coincident to the direction of the induced magnetic anisotropy naturally inherent in the MR element. Accordingly, the dispersion of anisotropy can be avoided, and therefore, the generation of Barkhausen noises can be restricted.

BRIEF DESCRIPTION OF THE DRAWINGS

These and other objects and features of the present invention will be apparent from the following description taken in conjunction with preferred embodiments thereof with reference to the accompanying drawings, in which.

DETAILED DESCRIPTION OF THE EMBODIMENTS

Figure 1:
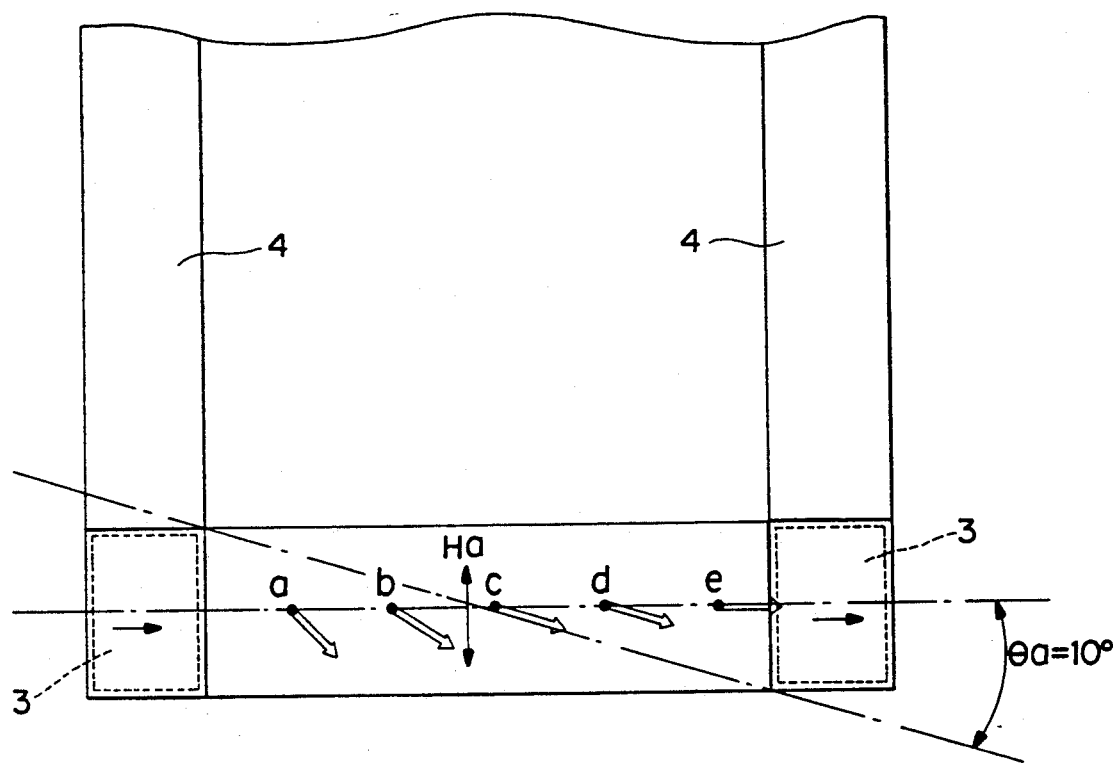
FIG. 1 is a graph explanatory of the distribution of the easy axis, etc. in the case where the average inclination angle $\theta_a$ of the easy axis in an MR element is set to be 10° according to a first embodiment of the present invention.

Before the description of the present invention proceeds, it is to be noted here that like parts are designated by like reference numerals throughout the accompanying drawings.

Figure 7A:
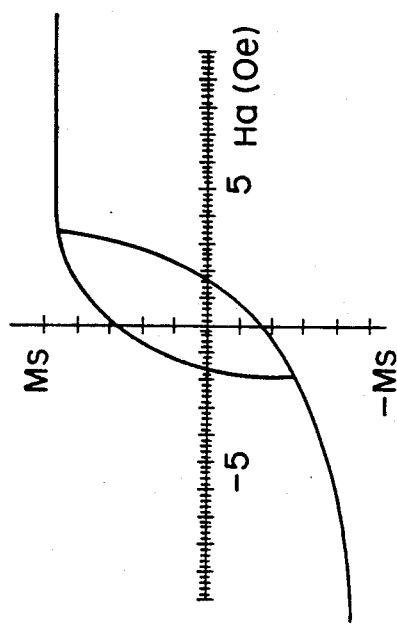
Figure 7B:
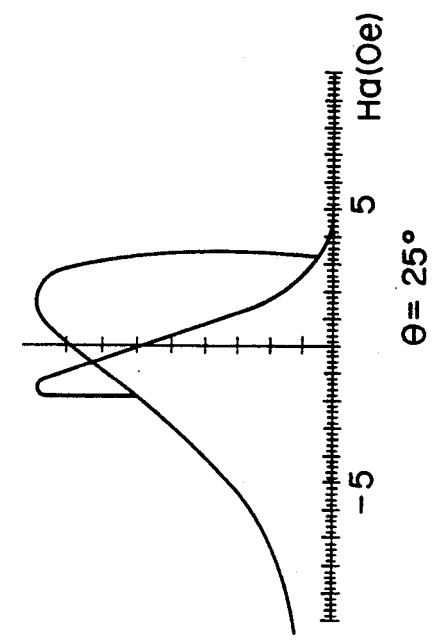
Figure 8:
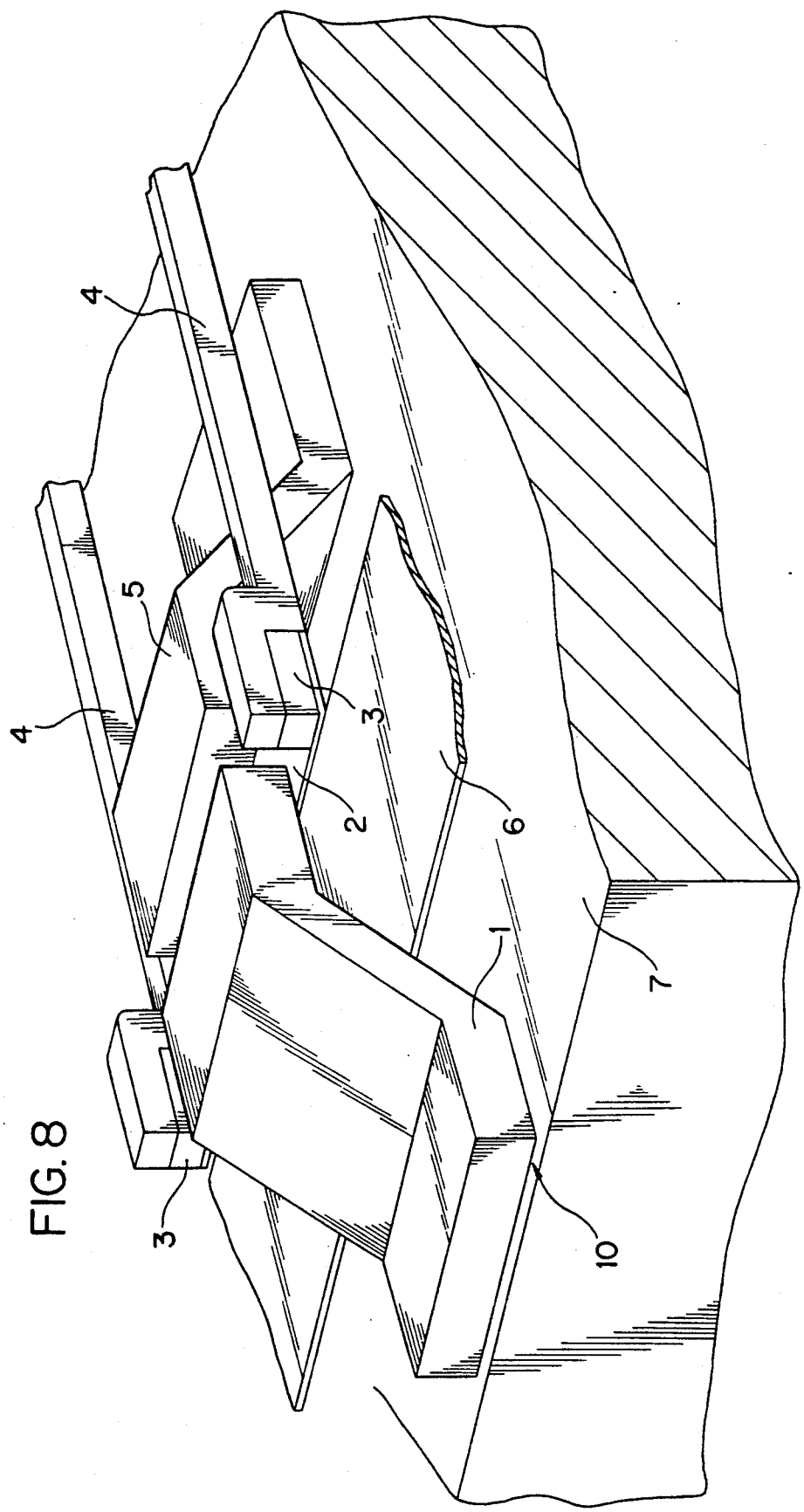
FIG. 8 is a perspective view showing the construction of the YMR head according to the first embodiment of the present invention.
Figure 9:
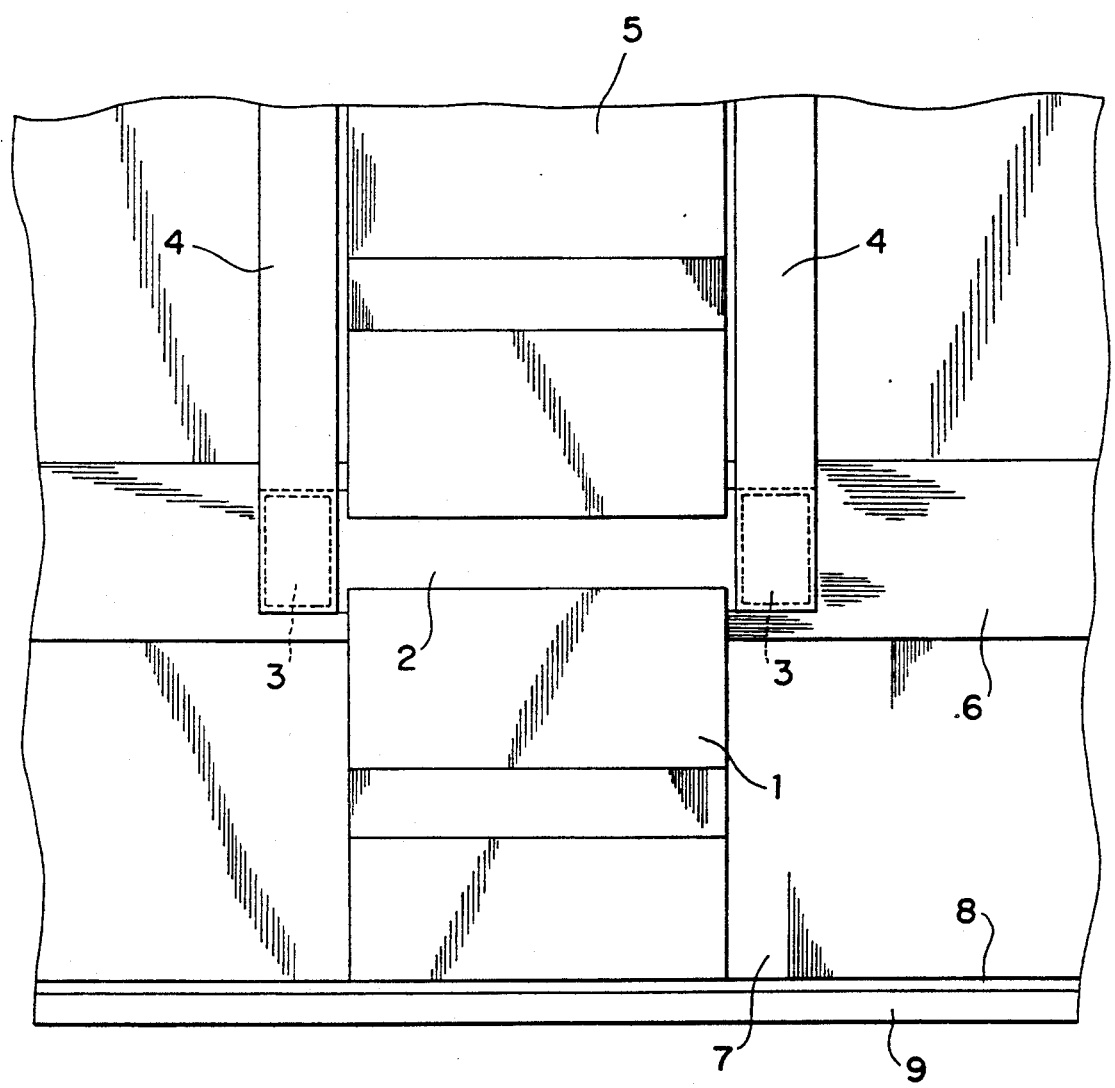
FIG. 9 is a plane view of the YMR head in FIG. 8.

Referring to FIGS. 1 to 9, a yoke thin film magnetic head according to a first embodiment of the present invention will now be described hereinafter. For sake of convenience in description, however, it is to be noted that FIGS. 8 and 9 are to be used, with reference numerals in FIGS. 8 and 9 corresponding to those in FIG. 1.

FIG. 8 shows the construction of a yoke thin film magnetic head (referred to as a YMR head) according to the present invention. The yoke thin film magnetic head has upper yokes 1 and 5 made of permalloy film generally having the film thickness of about 0.1–4.0 μm and forming an introduction path of the magnetic flux for introducing the magnetic field of signals produced in a magnetic recording medium to an MR element 2. Ferromagnetic films 3 and 3 have excellent conductivity and high coercive force, which are made of Co-P, Ni-Co, Ni-Co-P, etc. with the thickness of 1000–2000 Å. Lead conductors 4 and 4 are made of Al-Cu film of 1000–10000 Å in thickness. Further, an electric conductor 6 made of Al-Cu is provided below the MR element 2 in order to apply the biasing magnetic field to the MR element 2. A lower yoke 7 is fabricated by a high magnetic permeability material such as polycrystal Ni-Zn ferrite substrate or, single crystal or polycrystal Mn-Zn ferrite substrate or, ferromagnetic metal. A head gap 10 is set to be approximately 0.1–0.3 μm since the recording wavelength in actual use is about 0.5 μm at the smallest. Moreover, as shown in FIG. 9, a magnetic recording medium 9 is placed near the head gap 10 and a spacing 8 is formed between the magnetic recording medium 9 and the head gap 10.

Accordingly, the YMR head according to the first embodiment of the present invention is, as shown in FIGS. 8 and 9, comprised of the magnetic resistance effect element, that is, MR element 2 for detecting the magnetic flux of signals generated in the magnetic recording medium 9 as the change in resistance, the upper yokes 1 and 5 for leading the magnetic flux of signals from the head gap 10 to the MR element 2, the ferromagnetic films 3 and 3 working as a DC magnetic field applying members for applying a desired weak magnetic field to the MR element in the longitudinal direction thereof so as to make the MR element 2 into a single magnetized area, and the electric conductor 6 for applying a desired biasing magnetic field to the MR element 2 in the strip widthwise direction thereof. In the YMR head having the above-described structure, the easy axis of the magnetic anisotropy in the MR element 2 is inclined at 10° in the clockwise direction with respect to the longitudinal direction of the MR element 2, as shown in FIG. 1.

Figure 2A:
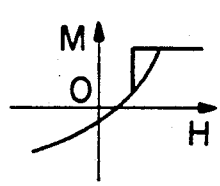
FIGS. 2(a) to 2(e) are graphs each showing the magnetization curve in the stripe widthwise direction of the MR element in respective points a-e in FIG. 1.
Figure 2B:
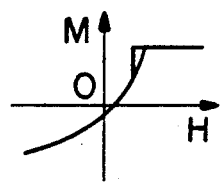
Figure 2C:
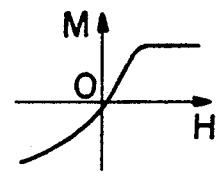
Figure 2D:
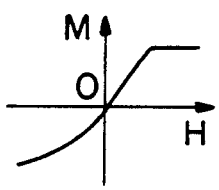
Figure 2E:
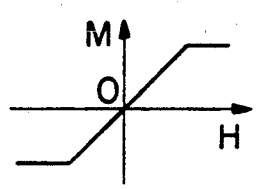
Figure 2F:
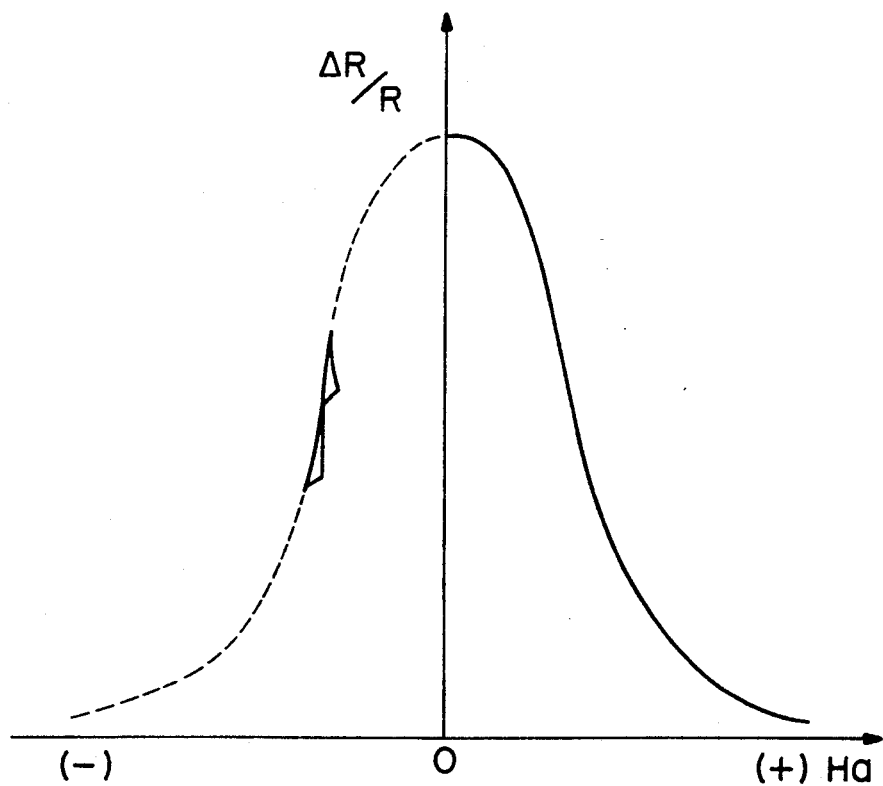
FIG. 2(f) is a graph showing the $\Delta R/R$ curve corresponding to a reproduced output of the MR element.
Figure 4A:
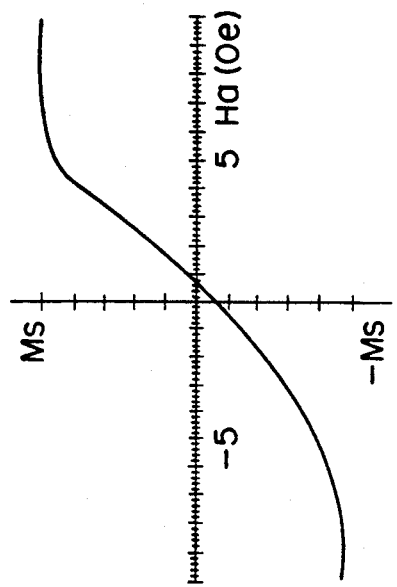
FIGS. 4(a), 5(a), 6(a) and 7(a) are graphs respectively showing the magnetization curve in the case where the inclination angle $\theta'$ is 0°, 10°, 20° and 25°.
Figure 4B:
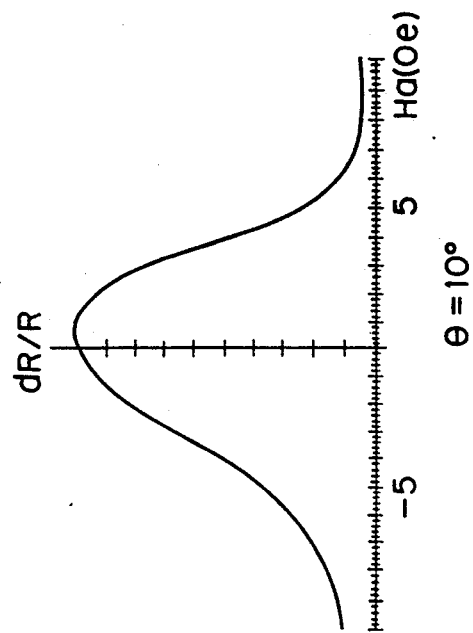
FIGS. 4(b), 5(b), 6(b) and 7(b) are graphs respectively showing the $\Delta R/R$ curve in the case where the inclination angle $\theta'$ is 0°, 10°, 20° and 25°.
Figure 5A:
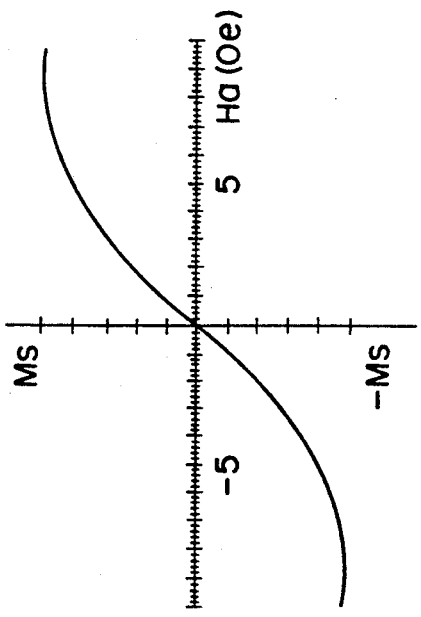
Figure 5B:
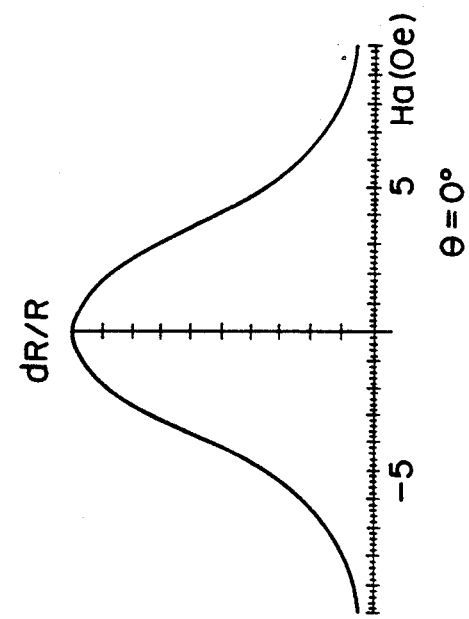

The ferromagnetic film 3 applies the weak magnetic field to the MR element in the direction shown by arrows, namely, from left to right in FIG. 1. Moreover, the direction of the easy magnetization axis in the MR element 2 in each point of the element is angularly dispersed to the same extent both at the positive side and at the negative side of the set magnetization easy axis. Supposing that the angle dispersion is approximately ±10°, the direction of the easy magnetization axis extends in the range of 0°-20° in the longitudinal direction of the MR element 2 all over the element 2. For example, at the point a on the MR element 2, the easy magnetization axis is inclined at 20° with respect to the longitudinal direction of the MR element. On the other hand, at the point e of the MR element 2, the easy magnetization axis turns approximately the same direction as the longitudinal direction of the MR element. Therefore, there is no zone or area in the MR element 2 where the easy magnetization axis is inclined in the counterclockwise direction to the longitudinal direction. At this time, the magnetization curve in the stripe widthwise direction of the MR element 2 at points a, b, c, d and 3 is represented respectively in FIGS. 2(a) to 2(e), while the $\Delta R/R$ curve is represented in FIG. 2(f). It is noticed from this FIG. 2(f) that discontinuities are brought about on a part of the $\Delta R/R$ curve only at the negative side of the magnetic field Ha. Accordingly, when the operating point of the MR element 2 is shifted to a point good at linearity by selecting the polarity of the biasing magnetic field, and the good point is at the positive side of the magnetic field Ha, the generation of Barkhausen noises which would otherwise be produced when the YMR head reproduces the magnetic field of signals can be suppressed. It is to be noted here that if the easy magnetization axis is inclined at 10° in the counterclockwise direction to the longitudinal direction of the MR element 2 when the element is fabricated, reverse direction to that in FIG. 1, with the other conditions maintained the same, discontinuities are observed on the $\Delta R/R$ curve at the positive side of the magnetic field Ha, showing the reverse representation of the curve from FIG. 2(f). It this case, the MR element 2 should be applied with such biasing magnetic field as to shift the operating point of the MR element to the negative side of the magnetic field Ha so that Barkhausen noises are never contained in reproduced output signals.

In the meantime, the main points for deciding the inclination angle of the easy magnetization axis with respect to the longitudinal direction of the MR element 2 (referred to as an inclination angle in the easy axis hereinbelow) when the MR element is fabricated will be described.

Figure 3:
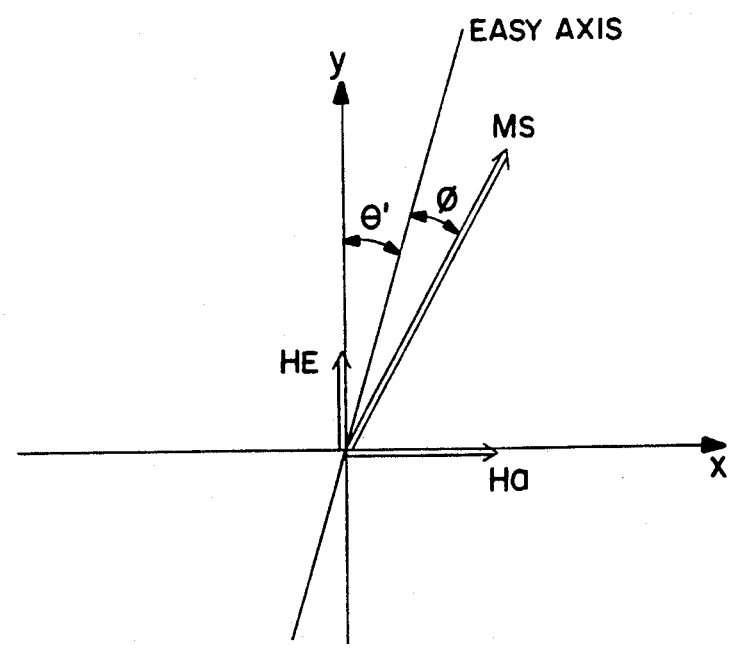
FIG. 3 is a graph explanatory of a general idea of single domain theory of Stoner-Wohlfarth model.
Figure 6A:
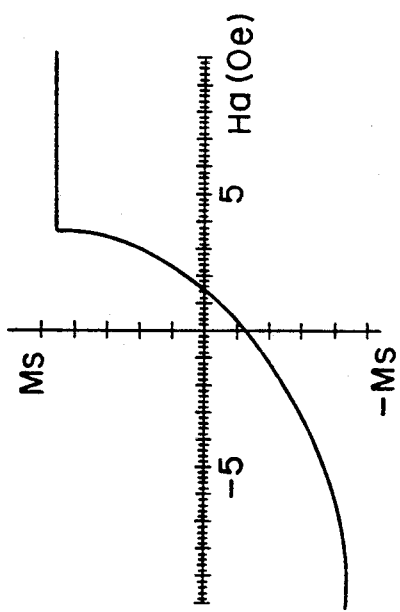
Figure 6B:
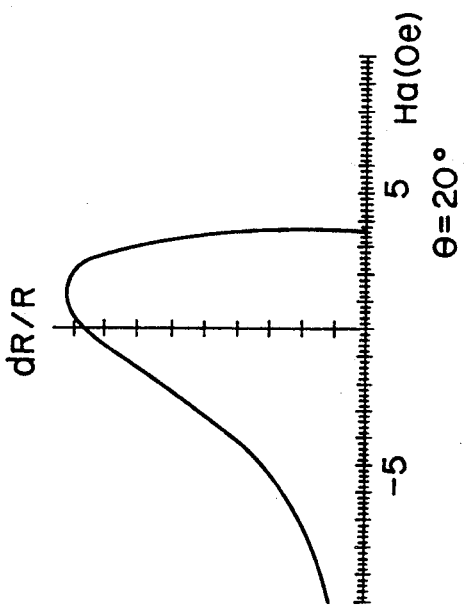

The MR element 2 of the YMR head responds to the magnetic field of signals in the condition that the demagnetization field in the MR element is small because the MR element is connected magnetically with the upper yokes 1 and 5, and the lower yoke 7. Further, since the MR element 2 is applied with weak magnetic field by the ferromagnetic film 3 which has high coercive force, the MR element 2 is in a single magnetic domain state. Taking these viewpoints into consideration, a suitable value for the anisotropic inclination angle can be estimated from Stoner-Wohlfarth's single domain model shown in FIG. 3. In FIG. 3, references $\theta'$, $H_E$, Ms and Ha represent the anisotropic inclination angle, weak magnetic field applied to the MR element 2 by the ferromagnetic film 3, saturated magnetization of the MR element 2 and the external magnetic field corresponding to the magnetic field of signals, respectively. Now, the rotational angle $\phi$ of the magnetization M in the MR element with respect to the external magnetic field Ha is calculated on the basis of properties of the MR element fabricated for trial, with supposing that $H_E$ is 1.3 [Oe], Ms is 796 [emu/cc] and $H_K$ is 4 [Oe], in such manner that the sum of the anisotropy energy and the magneto-static energy of the magnetization M is rendered to be minimized. Then, the magnetization curve in the x direction (shown in FIG. 3) and the $\Delta R/R$ curve are obtained, which are shown in FIGS. 4-7(a) and 4-7(b), respectively. As shown in FIGS. 6(a) and 6(b), when the anisotropic inclination angle $\theta$ is about 20°, the switching of the magnetization occurs at the positive side of the external magnetic field Ha. Further, as shown in FIGS. 7(a) and 7(b), when the anisotropic inclination angle $\theta$ is 25° or so, not only the switching of the magnetization takes place both at the positive side and at the negative side of Ha, and the magnetization curve splits into two (referred to as a hysteresis hereinbelow). On the other hand, when the same calculation is conducted with the other conditions remaining the same as in the above case except that $H_E$ is supposed to be 0.8 [Oe], the switching of the magnetization is brought about at the positive side of Ha when the anisotropic inclination angle $\theta$ is about 12°. As the anisotropic inclination angle $\theta$ is increased, the switching of the magnetization is given rise to both at the positive side and at the negative side of Ha. In addition to the above, it is confirmed that a hysteresis comes to be brought about in the magnetization curve in accordance with the increase of the anisotropic inclination angle $\theta$. As described above, if the anisotropic inclination angle $\theta$ exceeds some threshold value depending on the magnetic properties of the MR element 2 and $H_E$, the switching of the magnetization is brought about at both sides of Ha, causing Barkhausen noises. Meanwhile, it is proven that, if the anisotropic inclination angle $\theta$ is in the range where switching of the magnetization occurs at one side of Ha, the sensibility of the MR element 2 (indicated by the inclination in the tangential direction at each point of the $\Delta R/R$ curve) drops in accordance with the increase of the anisotropic inclination angle $\theta$. Based on the result of the foregoing calculations and, considering the magnetic properties of a general MR element and the fact that the angle dispersion of the easy magnetization axis in the general MR element is approximately 5°-10°, it is proper that the inclination of the easy magnetization axis of the MR element 2 should be set to be 5°-20°.

Accordingly, because of the above arrangement, the yoke thin film magnetic head of the present invention enables a point where discontinuities occur to be moved to the abscissa of the $\Delta R/R$ curve, that is, to either the positive side or the negative side of the magnetic field Ha corresponding to the magnetic field of signals. Therefore, when the operating point of the MR element 2 is moved by the biasing magnetic field to a point good at linearity, and if such operating point is at the side where no discontinuities occur in the magnetic field Ha, it becomes possible to suppress the switching of magnetization which would take place in the magnetic field are in the same polarity as the biasing magnetic field. Consequently, the generation of Barkhausen noises resulting from the switching of magnetization can be suppressed, thereby eventually to make output signals reproduced by the yoke thin film magnetic head high in quality.

A yoke thin film magnetic head according to a second embodiment of the present invention will be described with reference to FIGS. 10 to 14.

Figure 10:
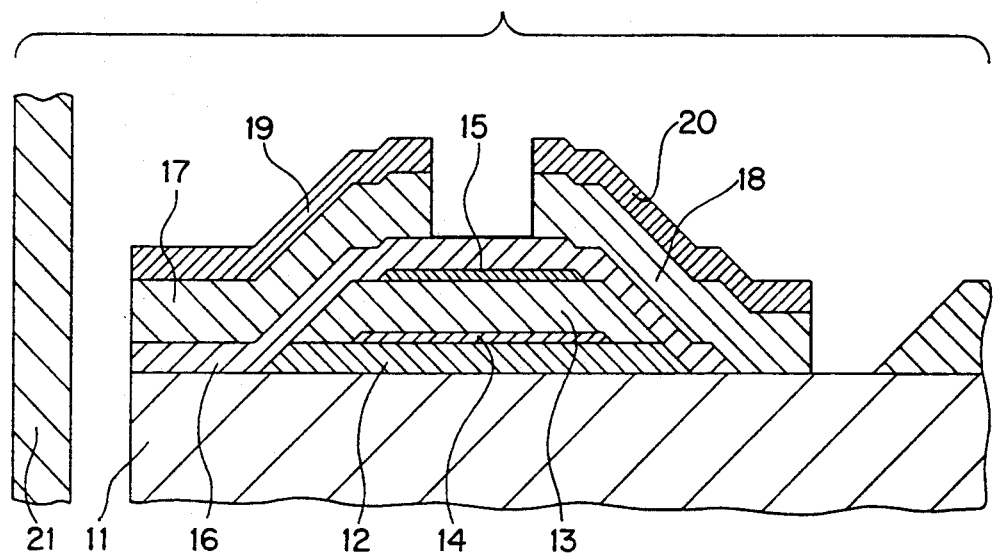
FIG. 10 is a vertical cross sectional view in the widthwise direction of a track of the YMR head according to a second embodiment of the present invention.

The yoke thin film magnetic head of the second embodiment of the present invention includes, as shown in FIG. 10, a first insulation layer 12 of a predetermined thickness placed onto a high magnetic permeability substrate 11 which is made of, for example, Ni-Zn ferrite substrate, a conductor 14 to apply bias magnetic field to MR element formed on the first insulation layer 12, and a second insulation layer 13 so formed onto the conductor 14 as to hide the conductor 14. The yoke thin film magnetic head is further provided with a magnetic resistance effect element 15 (referred to as an MR element hereinbelow) on the second insulation layer 13, which is made of a ferromagnetic film such as Ni-Fe film, Ni-Co film, etc. The ferromagnetic film of Ni-Fe or Ni-Co, etc. referred to above has generally a finite magnetostriction constant. On the MR element 15 is formed a gap insulation layer 16 in such manner as to cover the first insulation layer 12 and the second insulation layer 13. A first yoke 17 and a second yoke 18 provided on the gap insulation layer 16 constitute an introduction path (a magnetic gap) for introducing the magnetic flux of signals generated from a magnetic recording medium 21 to the MR element 15. First yoke 17 and MR element 15 and second yoke 18 and substrate 11 are so arranged as to form a closed magnetic, circuit sequentially. There are formed evaporated metal films 19 and 20 (films for cancelling the residual stress in the yokes 17, 18) having high melting points onto the yokes 17 and 18. The films 19 and 20 have generally the same configuration as the yokes 17 and 18. For the metal having high melting points, Mo, Nb, Ta, Hf, Ti, Cr, V or the like is employed.

The yokes 17 and 18 are coated with a ferromagnetic film of Ni-Fe or Ni-Co by sputtering. For example, the thickness of the ferromagnetic film is about 0.6 μm. In this case, for the purpose of achieving favorable magnetic properties (high magnetic permeability, low coercive force) required for the yokes, negative substrate biasing voltage needs to be applied during the sputtering. Moreover, according to the second embodiment of the present invention, before the coated Ni-Fe film is processed into the shape of a yoke, a film having high melting points made of, for example, Mo or Nb described above is coated onto the Ni-Fe film by evaporation. Thereafter, both the Ni-Fe film and the evaporated metal film are processed into the shape of a yoke at one time by ion milling to be the first and the second yokes 17 and 18, and the evaporated metal films having high melting points 19 and 20, respectively.

Figure 11:
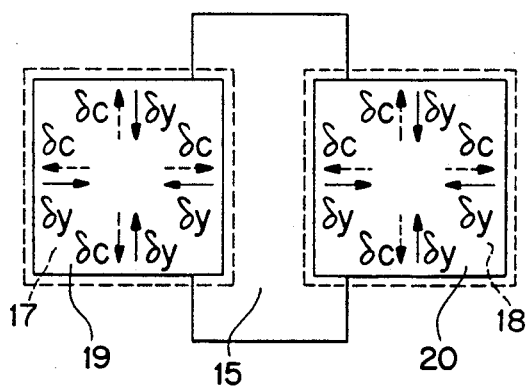
FIG. 11 is a diagram explanatory of the direction of residual stress in yokes and an evaporated metal film having high melting points of the YMR head FIG. 10.

The internal stress in the yokes 17 and 18, and in the MR elements of the thin film magnetic head of FIG. 10 is illustrated in FIG. 11, in which $\delta_y$ represents the compressive stress of the yokes 17 and 18, namely, the sputtered Ni-Fe films, and $\delta_c$ represents the tensile stress of the stress cancel film 19, that is, the evaporated Ni-Fe film. Since the stress applied to the MR element 15 by the yokes 17 and 18 is in proportional relation to $(\delta_y - \delta_c)$, it becomes possible to considerably reduce the stress generated in the MR element 15 if $\delta_y$ is selected to establish $\delta_y \simeq \delta_c$.

Figure 12:
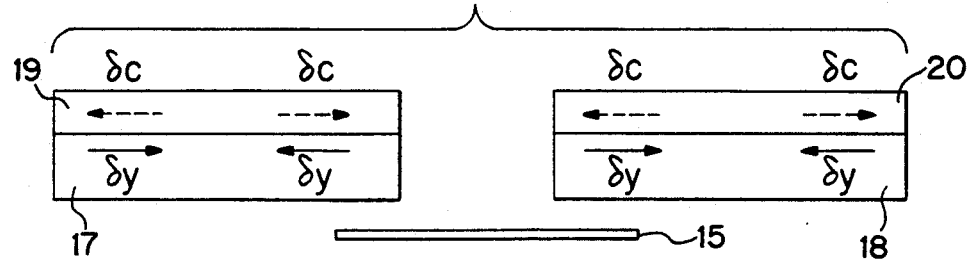
FIG. 12 is a diagram explanatory of the residual stress direction of individual thin film composing the YMR head in FIG. 10.

The internal stress of the sputtered Ni-Fe film on the yokes 17 and 18 employed in the second embodiment was approximately $-7 \times 10^9$ dyne/cm$^2$, while that of the evaporated Ni-Fe film of the stress cancel film 19 was approximately $+15 \times 10^9$ dyne/cm$^2$. Accordingly, the stress against the MR element 15 applied by the two-layered film of the yokes 17 and 18, and the stress cancel film 19 could be remarkably reduced by laying evaporated Ni-Fe films, each having the thickness of half of the sputtered Ni-Fe film, one after another, as shown in FIG. 12. Referring to FIG. 12 which is a vertical cross sectional view in the widthwise direction of the track of the head, the yokes 17 and 18 are layered with stress cancel films 19 and 20 each having the thickness of half of the yokes 17 and 18, respectively, such that the stress applied to the MR element 15 by the yokes 17 and 18 is cancelled on the whole.

The Ni-Fe film thus formed by application of the negative substrate biasing voltage has the internal compressive stress $\delta_c$ of about $1 \times 10^{10}$ dyne/cm$^2$ dis-anisotropically, as shown in FIG. 11. On the other hand, in the evaporated metal films 19 and 20 made of Mo, Nb or the like, also as shown in FIG. 11, dis-anisotropically exists the internal stress $\delta_y$ of about $1.2 \times 10^{10}$ dyne/cm$^2$ in the extending direction (with reference to "Thin Film Handbook", p. 341–342, published by Ohm Publishing Co., Ltd.). Accordingly, since the internal compressive stress present in the first and second yokes 17 and 18, and the internal tensile stress in the evaporated metal films 19 and 20 are repulsive with each other, the stress $(\delta_y - \delta_c)$ applied to the MR element 15 becomes substantially zero, or reduced on a large scale in comparison with the prior art. As a result of this, the magnetic anisotropy can be prevented from being disturbed, thereby to suppress the generation of Barkhausen noises as much as possible. It is to be noted here that although the evaporated metal films having high melting points and made of Mo or Nb, etc. are approximately of the same thickness as the Ni-Fe film, it is necessary to make the evaporated metal films, if they are made of material other than Mo and Nb, more thick than the films made of Mo or Nb since the internal tensile stress of such evaporated films made of material than Mo and Nb is relatively small. Accordingly, when the readiness for processing of the yokes is taken into consideration, it is most desirable to employ the evaporated metal films made of Mo or Nb described above. Furthermore, since the evaporated metal film 19 is eventually exposed to the sliding surface side of the magnetic recording medium 21, in conjunction with an end portion of the yoke 17, it is important that the film 19 is highly resistive against corrosion in order to improve the reliability of the YMR head. From the above-described viewpoint of resistivity against corrosion also, it can be said that the evaporated metal film made of Mo or Nb is superior.

Figure 14:
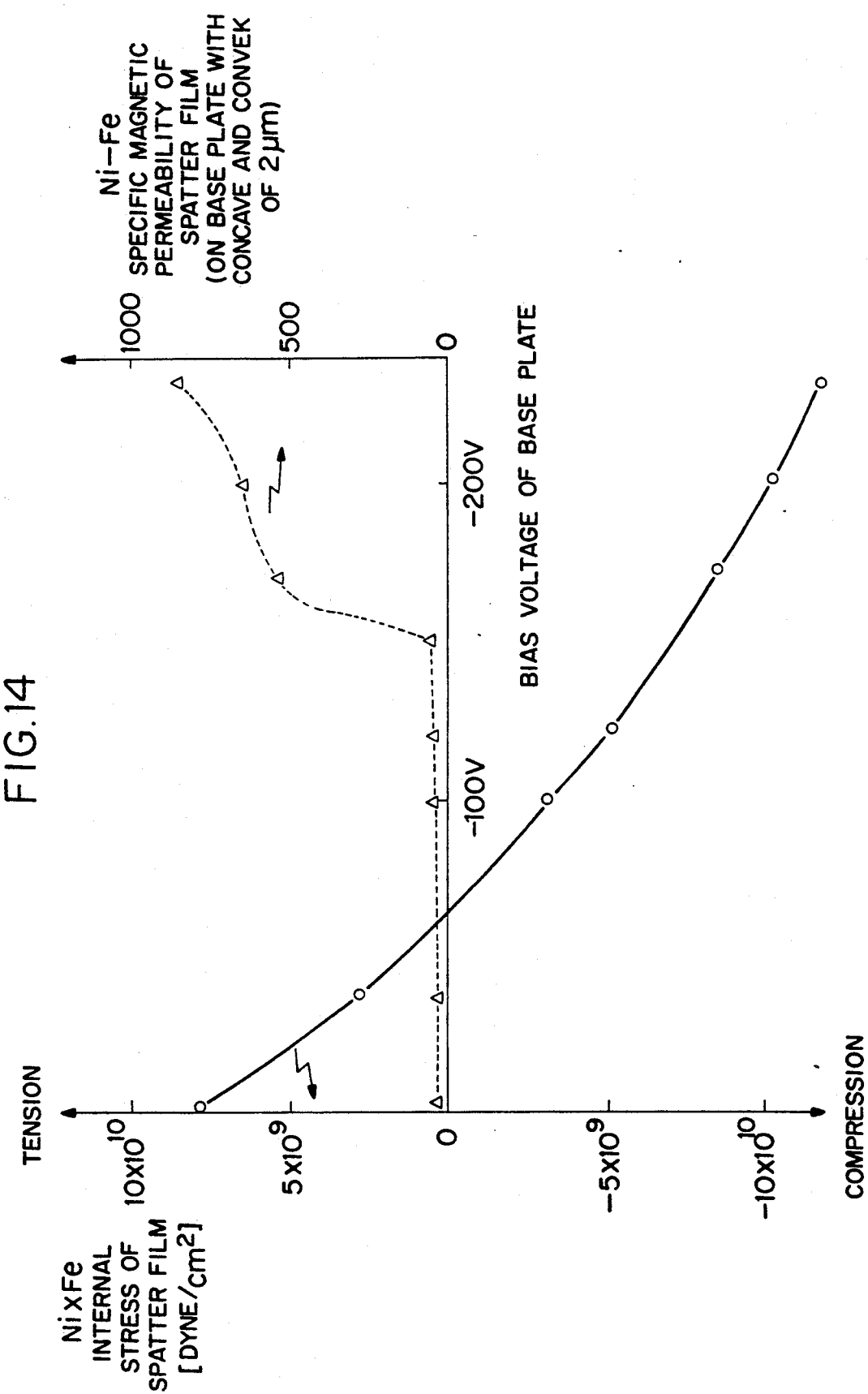
FIG. 14 is a graph showing the relationship between the substrate biasing voltage and the residual stress of a sputtered Ni-Fe film and also the relationship between the substrate biasing voltage and the magnetic permeability of the sputtered Ni-Fe film.

Referring to a graph of FIG. 14, there is shown the internal stress in the sputtered Ni-Fe film formed by a three electrode sputtering device in which the target current and the target object can be controlled independently from each other, and the magnetic permeability of the sputtered Ni-Fe film formed onto the substrate having unevenness of 2 μm (the same condition as the YMR head) by the three electrode sputtering device. When the substrate biasing voltage is in the range of 0~150 V, the direction of the easy axis of the magnetic anisotropy in the Ni-Fe film is vertical to the film surface. Therefore, the magnetic permeability is low, and the Ni-Fe film cannot be used for the yoke film. When the substrate biasing voltage is less than −150 V, the direction of the easy axis in the Ni-Fe film becomes horizontal to the film surface, with the magnetic permeability being raised in accordance with the decrease of the substrate biasing voltage, and accordingly, Ni-Fe film which can be used as the yoke is the Ni-Fe film which is applied with the substrate biasing voltage lower than −150 V. If the substrate biasing voltage becomes below −150 V, the internal compressive stress in the Ni-Fe film exceeds $8 \times 10^9$ dyne/cm$^2$, and thereafter, the internal compressive stress gradually increases in accordance with the decrease of the substrate biasing voltage. As described above, the internal compressive stress in the sputtered Ni-Fe film changes in accordance with the change in the substrate biasing voltage. However, the total internal tensile stress in the evaporated metal film can be easily changed by changing the thickness of the evaporated metal film, the change of the internal compressive stress in the sputtered Ni-Fe film can be coped with easily. Accordingly, it becomes possible to set conditions for sputtering the Ni-Fe film desirably, without any limitations imposed by the internal stress of the Ni-Fe film. Thus, the Ni-Fe film can be formed with such conditions that can render the magnetic properties of the Ni-Fe film most excellent, resulting not only in suppression of Barkhausen noises, but in realization of a YMR head high in sensibility.

Figure 13:
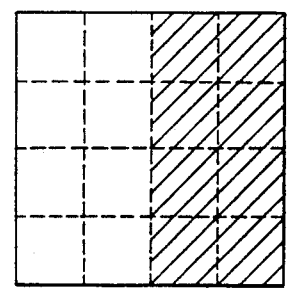
FIG. 13 is a plane view parallel to a substrate of the YMR head in FIG. 10.

FIG. 13 shows an example that the thin film magnetic head of the present invention and the prior art thin film magnetic head are arranged in parallel onto a single substrate. In the drawing, each chip is constituted by a head having 20 tracks. 8 chips shown by oblique lines are constructed in accordance with the present invention, while the remaining 8 chips are constructed according to the prior art, both fabricated from the same substrate. In the manner as above, Barkhausen noises appear on 87 tracks among 160 tracks ($20 \times 8 = 160$) in the thin film magnetic head of the present invention. On the other hand, there are 140 tracks among 160 tracks on which Barkhausen noises are generated in the known thin film magnetic head. Thus, according to the present invention, the thin film magnetic head can be distinguishably free from the Barkhausen noises.

Although the yokes 17 and 18 are Ni-Fe films formed by sputtering, and the stress cancel films 19 and 19 are Ni-Fe films formed by vaporization in the second embodiment, the reverse combination of the films may be possible. Further, various other combinations for the yokes 17 and 18 and, the stress cancel films 19 and 19 can be employed.

In other words, for the yoke films 17 and 18, the following may be applicable: Ni-Fe film (compressive stress), evaporated Fe-Al-Si film (tensile stress), sputtered Fe-Al-Si film (compressive or tensile stress), evaporated amorphous film (tensile stress) in which Co contains about 10-20% of such semi-metal as Si, B and P or such metal as Zr, Ti, Nb, Ta, Hf or W, sputtered amorphous film (compressive stress) in which Co contains approximately 10-20% of such semi-metal as Si, B or P, or transition metal such as ZR, Ti, Nb, Ta, Hf or W. On the other hand, for the stress cancel films 19 and 19, evaporated metal film (tensile stress) made of W, Ti, Ta, Zr, Nb, Hf or the like, sputtered metal film (compressive stress) made of W, Ti, Ta, Zr, Nb, Hf, etc., sputtered insulation film (compressive stress) made of SiO$_2$, Al$_2$O$_3$, Si$_3$N$_4$ or the like can be employed, in addition to the aforementioned films applicable for the yoke films 17 and 18. However, it is needless to say that it is necessary that the polarity of the stress in the films 17 and 18 should be opposite to that in the films 19 and 19.

The yoke thin film magnetic head according to the present invention is, as has been described hereinabove with reference to the second embodiment thereof, provided with yokes placed for leading the magnetic flux of signals generated from the magnetic recording medium up to the MR element. The yokes are made of sputtered films to hold the compressive stress therein. Moreover, the yoke thin film magnetic head has evaporated metal films formed onto the yokes. Since the evaporated metal films have internal tensile stress approximately equal to the internal compressive stress of the yokes, the internal compressive stress generated in the yokes can be substantially negated or reduced. Thus, the disturbance of the magnetic anisotropy in the MR element caused by the residual stress in the yokes can be suppressed, and at the same time Barkhausen noises can be made small. Moreover, the conditions for sputtering the yoke material can be suitably set, with no limitations imposed by the internal stress of the material. Therefore, it becomes possible to prepare the yoke film by sputtering under the condition that the magnetic properties of the material can be rendered best. Accordingly, the yoke thin film magnetic head of the present invention can be highly sensitive.

A third embodiment of the present invention will be described with reference to FIGS. 15 to 18.

Figure 15:
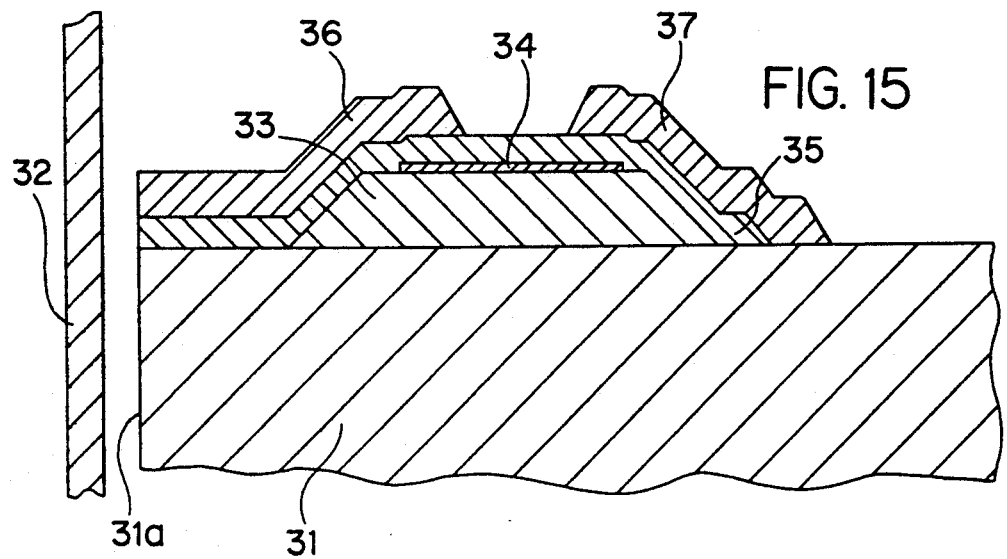
FIG. 15 is a longitudinal cross sectional view of a YMR head according to a third embodiment of the present invention.

As shown in FIG. 15, a YMR head according to the third embodiment has, at one end 31a of a substrate 31, a sliding surface to be slid with a magnetic recording medium 32. The substrate 31 constituting a lower yoke is made of a ferrite substrate such as polycrystal Ni-Zn ferrite substrate or, a single crystal or polycrystal Mn-Zn ferrite substrate, or a high magnetic permeability substrate having a high magnetic permeability thin film like Ni-Fe, Fe-Al-Si or Co-Zr layered onto a nonmagnetic substrate. For example, since the YMR head generally has many tracks, the width of a track of the magnetic recording medium 32 is set to be approximately 50 μm. An insulation layer 33 made of SiO$_2$, etc. is formed on the substrate 31 near the end surface 31a, with a magneto-resistive element (referred to as an MR element) 34 being put on the insulation layer 33. The MR element 34 is made of a ferromagnetic film such as Ni-Fe film or Ni-Co film, etc., having the thickness of 200 Å–1000 Å, and the length approximately equal to the track width of the magnetic recording medium 32. Moreover, the MR element 34 has a positive or negative magnetostriction constant to correspond to the polarity of the residual stress, either to the compressive stress or to the tensile stress, generated in the upper yokes 36 and 37 which will be described later. Therefore, in the case where the internal stress $\delta_y$ of the upper yokes 36 and 37 is tensile, namely positive, the magnetostriction constant of the MR element is set to be negative. On the contrary, in the case where the internal stress $\delta_y$ is compressive, namely negative, the magnetostriction constant $\lambda_s$ is set to be positive. Furthermore, upon fabricating the MR element 34, the easy magnetization axis in the MR element 34 is selected in the longitudinal direction of the MR element 34. When a sense current $I_s$ runs in the longitudinal direction of the MR element 34, the MR element 34 converts the magnetic field of signals from the magnetic recording medium 32 into the change in voltage at opposite ends of the MR element 34. On the substrate 31, the insulation layer 33 and the MR element 34, there is formed a gap insulation film 35 in such manner as to cover the substrate 31, the layer 33 and the element 34. This gap insulation film 35 is made of SiO₂ or the like. An upper yoke 36 which is a first yoke and an upper yoke 37 which is a second yoke are placed opposite to each other, with a gap therebetween, on the gap insulation film 35. The ferromagnetic upper yokes 36 and 37 generally made of permalloy films having the thickness of approximately 0.5–4.0 μm constitute a magnetic path for magnetic recording signals detected from the magnetic recording medium 32. The upper yoke 36, the MR element 34 and the upper yoke 37 are magnetically connected to each other in this order.

In the YMR head, it is so arranged that, if a current $I_B$ for applying biasing magnetic field is sent into a biasing conductor (not shown), the MR element 34 is given with a desired biasing magnetic field, such that the operating point of the MR element 34 is moved to a point good at linearity.

In the above-described arrangement, the predetermined magnetostriction constant $\lambda_s$ is set for the MR element 34 as mentioned earlier, which can be determined depending on the conditions how the MR element 34 is fabricated. By way of example, however, if the MR element 34 is made of Ni-Fe film except when it contains 79–82 wt % of Ni therein, the magnetostriction constant $\lambda_s$ of the MR element 34 is changed by the influences of the crystal orientation of the Ni-Fe film, and therefore it is difficult to prepare the Ni-Fe film in such manner as to make the magnetostriction constant $\lambda_s$ to be zero (with reference to J. Appln. Phys. 52(3), March 1981, P2474–2476 "The Saturation Magnetostriction of Permalloy Film"). On the contrary, it is easy to fabricate the MR element 34 in such manner that the magnetostriction constant of the Ni-Fe film is controlled to be either positive or negative of the magnetostriction constant $\lambda_s$ of the MR element 34.

Figure 16:
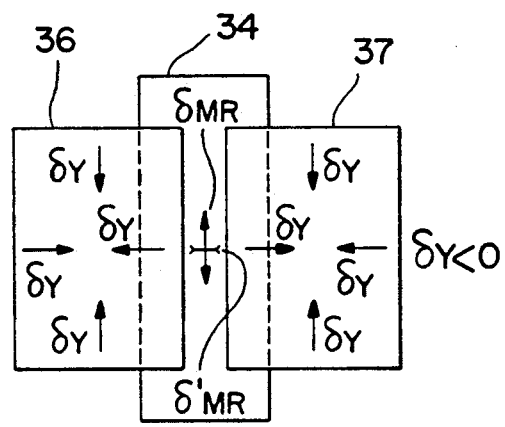
FIGS. 16 and 17 are diagrams each explanatory of the relations among the residual stress of an upper yoke of the head, the internal stress generated against the residual stress of the upper yoke in an MR element, and the magnetostriction constant of the MR element.
Figure 17:
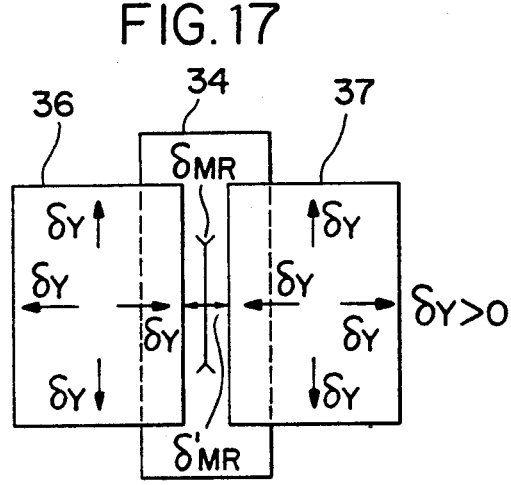
Figure 18:
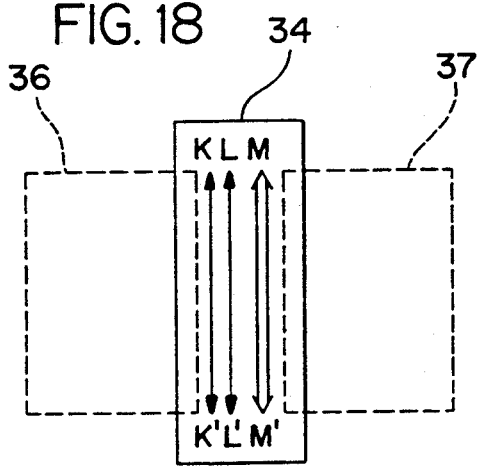
FIG. 18 is a diagram explanatory of the direction of the magnetic anisotropy induced in the MR element.
Figure 19:
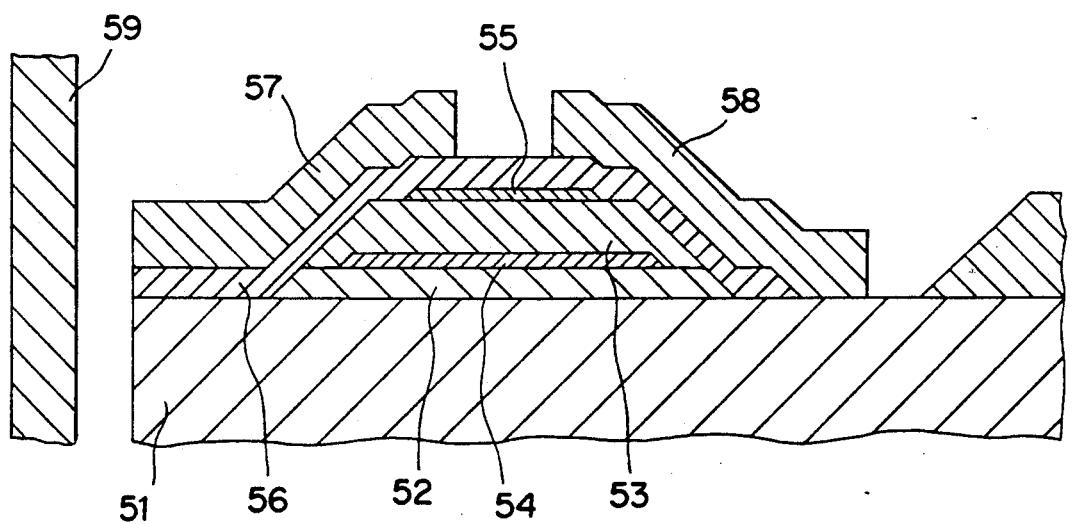
FIG. 19 is a vertical cross sectional view in the widthwise direction of a track of a prior art YMR head.

Accordingly, if the polarity of the magnetostriction constant $\lambda_s$ of the film of the MR element 34 is selected in correspondence to the polarity of the internal stress $\delta_y$ in the upper yokes 36 and 37, the magnetostriction effect is generated in the MR element of the yoke film, thereby to lessen the influences by residual stress of the yoke film. In this case, it is supposed that when $\delta_y$ is positive, the tensile stress is generated in the film of the upper yokes 36 and 37, while when $\delta_y$ is negative, the compressive stress is generated in the film of the upper yokes 36 and 37. In other words, in the case where the polarity of the internal stress $\delta_y$ of the film of upper yokes 36 and 37 is negative, the external stresses $\delta_{MR}$ and $\delta'_{MR}$ applied to the MR element 34 as the result of the reaction to the internal stress $\delta_y$ work, as shown in FIG. 16, as tensile stress in the longitudinal direction and compressive stress in the widthwise direction of the MR element. It is to be noted here that $\delta_{MR}$ represents the stress in the longitudinal direction of the MR element 34, and $\delta'_{MR}$ represents the stress in the widthwise direction of the MR element 34. In the case where the internal stress $\delta_y$ in the film of the upper yokes 36 and 37 is directed in the positive direction, the external stress $\delta_{MR}$ and $\delta'_{MR}$ applied to the MR element 34 as the reaction to the internal stress $\delta_y$ are, as shown in FIG. 17, compressive stress in the longitudinal direction, and tensile stress in the widthwise direction. Therefore, by arranging the relationship between the internal stress $\delta_y$ in the film of the upper yokes 36 and 37, and the magnetostriction constant $\lambda_s$ of the MR element 34 as follows:

when $\delta_y < 0$, $\lambda_s > 0$ and when $\delta_y > 0$, $\lambda_s < 0$, the magnetic anisotropy L—L' of the MR element 34 induced by the stress of the upper yokes 36 and 37 is in the longitudinal direction of the MR element 34. Since the direction of this magnetic anisotropy L—L' is coincident to the direction of magnetic anisotropy K—K' induced when the MR element is fabricated, the composed magnetic anisotropy M—M' is also rendered coincident to the longitudinal direction of the MR element 34. In consequence to this, discontinuities are hardly generated in the magnetization within the MR element 34, and accordingly it becomes advantageous that the internal stress in the film of the upper yokes 36 and 37 never affect the magnetic properties of the MR element 34 by Barkhausen noises, etc.

Showing a concrete example, when the upper yokes 36 and 37 are made of sputtered Ni-Fe film or sputtered Co-Cr film, since the stress in the upper yokes 36 and 37 are generally compressive stress, the magnetostriction constant $\lambda_s$ of the MR element 34 is set to be positive. Further, when the upper yokes 36 and 37 are made of evaporated Ni-Fe film or plated Ni-Fe film, the stress in the upper yokes 36 and 37 is tensile stress, and accordingly, the magnetostriction constant $\lambda_s$ of the MR element 34 is set to be negative. Similarly, when the materials other than the aforementioned materials are used for the upper yokes 36 and 37, the magnetostriction constant $\lambda_s$ of the MR element 34 is determined selectively to be positive or negative in correspondence to the stress generated in the yoke material.

As has been described hereinabove, the reluctance effect thin film head, i.e., the YMR head according to the third embodiment of the present invention has the first yoke, the MR element and the second yoke, all made of ferromagnetic thin films, magnetically connected to each other sequentially in this order. The reluctance effect thin film head is so constructed that when the internal stress generated in the first and the second yokes is positive, the magnetostriction constant of the MR element is set to be negative, while, when the internal stress generated in the first and the second yokes is negative, the magnetostriction constant of the MR element is set to be positive. Because of the above-described construction, the direction of the magnetic anisotropy of the MR element induced by the internal stress in the first and the second yokes can be made coincident to the direction of the magnetic anisotropy induced when the MR element is fabricated. As a result, the anisotropy in the MR element can be prevented from being dispersed, thereby to reduce Barkhausen noises. Accordingly, the reluctance effect thin film head with high fidelity can be realized.

What is claimed is:

1. A thin film magnetic head comprising:
   a magneto-resistive element;
   a plurality of yokes, each one of said yokes formed of a sputtered film with residual compressive stress contained therein and operatively connected to said magneto-resistive element for leading magnetic flux of signals from a magnetic recording medium to said magneto-resistive element; and
   a high melting point film coated on each of the sputtered films, the high melting point film having a residual tensile stress approximately equal to the residual compressive stress in the sputtered film, so that residual stresses in the magneto resistive element are reduced resulting in a reduction in Barkausen noise.

2. A thin film magnetic head comprising:
a magneto-resistive element;
at least one yoke, formed of a first film, with residual stresses operatively connected to the magneto-resistive element for leading magnetic flux, to said magneto-resistive element;
said first film being coated with a film having an internal stress value effective for reducing the influence of residual stresses in the first film, so that the residual stresses do not effect the magneto-resistive element and Barkhausen noises are reduced.

3. A thin film magnetic head comprising:
a first yoke;
a second yoke;
a magneto-resistive element formed of a material having a magnetostriction constant of a positive value;
said yokes and magneto-resistive element formed of ferromagnetic thin films and magnetically connected to each other;
said first and second yokes having negative internal compressive stresses, so that Barkhausen noises are reduced.

4. A thin film magnetic head claimed in claim 3, wherein there is an insulation film between the yokes and the magneto-resistive element.

5. A thin film magnetic head comprising:
a first yoke;
a second yoke;
a magneto-resistive element formed of a material having a magnetostriction constant of a negative value;
said yokes and magneto-resistive element formed of ferro magnetic thin films and magnetically connected to each other
said first and second yokes having positive internal tensile stresses so that Barkhausen noises are reduced.

6. A thin film magnetic head claimed in claim 5, there is an insulation film between the yokes and the magneto-resistive element.

* * * * *